Patented Feb. 10, 1925.

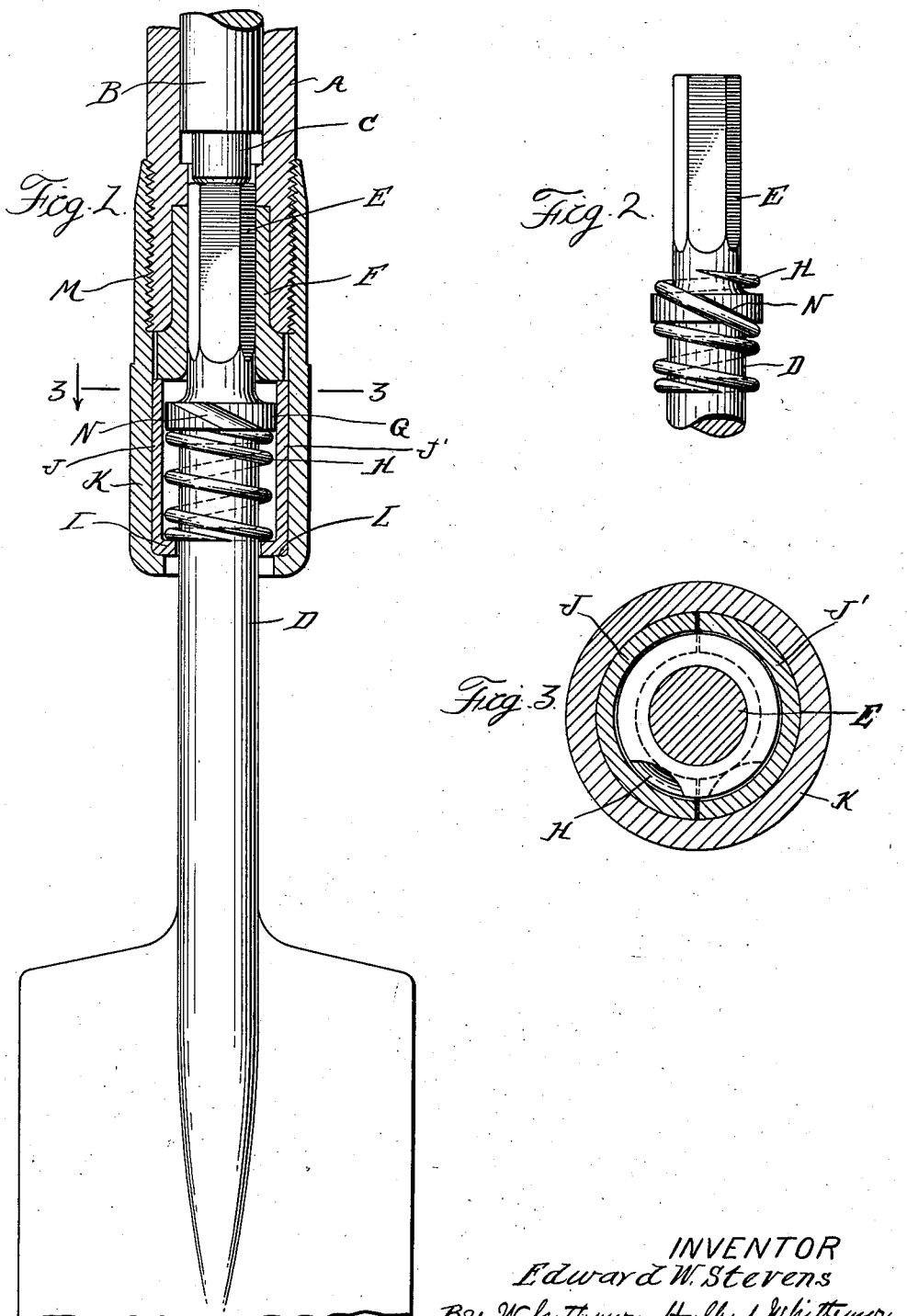

1,525,471

UNITED STATES PATENT OFFICE.

EDWARD W. STEVENS, OF DETROIT, MICHIGAN, ASSIGNOR TO CHICAGO PNEUMATIC TOOL COMPANY, OF NEW YORK, N. Y., A CORPORATION OF NEW JERSEY.

COUPLING FOR PERCUSSIVE TOOLS.

Application filed July 25, 1921. Serial No. 487,357.

*To all whom it may concern:*

Be it known that I, EDWARD W. STEVENS, a citizen of the United States of America, residing at Detroit, in the county of Wayne and State of Michigan, have invented certain new and useful Improvements in Couplings for Percussive Tools, of which the following is a specification, reference being had therein to the accompanying drawings.

The invention relates to coupling devices designed for use in connecting percussive motors with the tools actuated thereby, and the invention consists in the novel construction as hereinafter set forth.

In the drawings:

Figure 1 is an elevation of the tool showing the coupling for the same to the percussive motor in longitudinal sections;

Figure 2 is an elevation of a portion of the tool shank showing the manner of inserting the spring beneath the abutment collar therefor;

Figure 3 is an enlarged section on line 3—3 of Figure 1.

My improvement is particularly applicable to tools, such, for instance, as spades, which have a percussive motor connected thereto. It is necessary to form a connection which will retain the shank of the tool in engagement with the motor and will provide a resilient cushion, relieving the motor casing from impact. It is also necessary to provide for quickly attaching and detaching the percussive motor or for exchanging the tools which are used in connection therewith. This I have accomplished by the following construction:—

A is the casing of the percussive motor, B the reciprocatory piston therein provided with the impact projection C, and D the shank of the tool. This shank is provided with the polygonal portion E for fitting in a correspondingly shaped socket in the end of the casing A formed by the bushing F. The shank is further provided with a collar G which forms an abutment for the cushioned spring H sleeved on the shank. The opposing abutment for the spring must be rigidly attached to the casing A and on account of the collar G, it would be impossible by an end-wise movement to relatively position these parts. I avoid the difficulty by forming the opposing abutment I on a sectional bushing J, J', which bushing is surrounded by a sleeve K having an end-thrust shoulder L thereon, but with an aperture therethrough of sufficient diameter for the passage of the collar G. The sleeve K is engaged with the casing A by suitable means, such as the threaded engagement M, and the bushings J and J' are clamped between the shoulder L and the end of the bushing F.

Where the collar G is formed integral with the shank D, provision must be made for engaging the spring with a portion of the shank between the collar and the spade. For this purpose I have formed an inclined channel N in the collar G, through which the end of the spiral spring may be threaded and which permits of securing the spring past the collar into proper position on the shank, as shown in Figure 2. To complete the assembly, the sleeve K is slipped downward upon the shank D beyond the collar G and spring H, after which the sectional bushing J, J' is placed upon opposite sides of the shank and collar and spring. The sleeve is then moved up and screwed upon the casing A until the ends of the sectional bushing J, J' are clamped between the shoulder L and the lower end of the bushing F. This will securely couple the tool with the percussive motor, while permitting of quickly attaching or detaching the same.

What I claim as my invention is:

1. The combination with a percussive motor, a tool therefor and a cushioning spring, of a collar on the shank of said tool forming an abutment for said spring, said collar having an inclined channel therethrough permitting of the screwing of the spring therethrough to engage a portion of the shank beyond the collar.

2. The combination with a percussive motor and a casing therefor, of a tool having a shank with an end portion engageable with the socket in the casing, and an integral collar beyond said end portion having an inclined channel therethrough, a spiral spring sleeved upon said shank and adapted to be screwed through said inclined channel beyond said collar to abut against the same, a coupling sleeve having a threaded engagement with said motor casing and endwise engageable with said shank over said collar and spring, and a sectional bushing laterally engageable with said shank and providing an opposing abutment for said spring, said bushing being endwise engageable with said sleeve and clamped thereby against said motor casing.

3. A tool adapted to be removably mounted for actuation by percussive mechanism and having an integral collar, said collar having an inclined channel to permit the screwing therethrough of a cushioning spring, the radius of which spring is equal to or less than the radius of said collar.

4. A tool adapted to be removably mounted for actuation by percussive mechanism, said tool comprising an enlarged working end and a shank extending therefrom, said shank having a collar to serve as an abutment for a cushioning spring, said collar being partly cut away to permit a spring to be sleeved over the tool intermediate its collar and its working end without radial deformation of the spring.

In testimony whereof I affix my signature.

EDWARD W. STEVENS.